United States Patent [19]
Southwell et al.

[11] Patent Number: 5,425,964
[45] Date of Patent: Jun. 20, 1995

[54] DEPOSITION OF MULTIPLE LAYER THIN FILMS USING A BROADBAND SPECTRAL MONITOR

[75] Inventors: William H. Southwell, Thousand Oaks; Randolph L. Hall, Newbury Park, both of Calif.

[73] Assignee: Rockwell International Corporation, Seal Beach, Calif.

[21] Appl. No.: 278,762

[22] Filed: Jul. 22, 1994

[51] Int. Cl.[6] .............................................. B05D 1/36
[52] U.S. Cl. ...................................... 427/10; 427/402
[58] Field of Search .................................. 427/10, 402

[56] References Cited

U.S. PATENT DOCUMENTS

5,000,575  3/1991  Southwell et al. ................... 356/382

OTHER PUBLICATIONS

Borgogno et al., "Inhomogeneity in Films: Limitation of the Accuracy of Optical Monitoring of Thin Films," *Applied Optics*, vol. 20, No. 1, pp. 90–94, Jan. 1, 1981.

Grèzes-Besset et al., "Synthesis and Research of the Optimum Conditions for the Optical Monitoring of Non-Quarter-Wave Multilayers," *Applied Optics*, vol. 32, No. 28, pp. 5612–5618, Oct. 1, 1993.

*Primary Examiner*—Bernard Pianalto
*Attorney, Agent, or Firm*—John C. McFarren

[57] ABSTRACT

A method is provided for monitoring and controlling the deposition of multiple layer thin films using a broadband spectral monitor and a generalized model of the film. A design specification, including the number of layers and the material, refractive index, and thickness of each layer, is provided for the desired thin film. A target optical thickness is computed for the end point of each layer using correction factors based on the generalized model, preferably a single layer model, of the multilayer thin film. A monitor chip, such as a silicon substrate, is used for monitoring the multiple layers of film deposition. During deposition of the film, a broadband spectral monitor (BBSM) comprising a source of broadband light is directed onto the monitoring chip. Light reflected by the monitoring chip is received by a photosensor that provides a broadband reflectance spectrum to a computer. The BBSM reflectance spectrum is fit to the generalized model to produce an output corresponding to the optical thickness of the deposited film. When the broadband spectral monitor optical thickness measurement equals the target optical thickness at the end point of the layer, deposition of that layer is terminated and deposition of the next layer may commence. This process is repeated during the deposition of each successive layer until the entire multiple layer thin film is complete.

18 Claims, 3 Drawing Sheets

DEPOSITION OF MULTIPLE LAYER THIN FILMS USING A BROADBAND SPECTRAL MONITOR

TECHNICAL FIELD

The present invention relates to methods of fabricating thin films and, in particular, to a method of controlling the deposition of multiple layer thin films using a broadband spectral monitor.

BACKGROUND OF THE INVENTION

Thin films of materials with appropriate thickness and refractive index have important applications in fields such as semiconductors and optics. If a thin film is deposited on a lens, for example, the reflection of particular wavelengths of light from the surface of the lens can be almost completely suppressed. Because of the beneficial effects of thin films, such as antireflection, substantially all high quality optical components are provided with optical films.

Thin films generally include multiple layer films as well as films having a refractive index with a continuous gradient. In multiple layer optical films, such as quarterwave stacks, at least two different materials, one with a relatively high index of refraction and a second with a relatively low index of refraction, for example, are typically deposited in a controlled sequence of alternating layers of specified thicknesses to obtain the desired (specified) optical characteristics. Ideally, the deposition process is controlled by monitoring the thickness of each layer as it is deposited and terminating deposition when the layer reaches the desired thickness. The sought after ability to deposit each layer to precisely the correct thickness would provide flexibility in designing a wide range of multiple layer coatings for various transmission and reflection spectra, for example. Antireflection coatings, laser dielectric mirrors, television camera edge filters, optical bandpass filters, and band-rejection filters are some examples of the many useful devices that include multilayer thin film coatings.

Background information on fabrication of thin films is presented in Macleod, *Thin-Film Optical Filters*, 2nd Ed., pp. 423–445, MACMILLAN (New York, 1986). During fabrication of thin films, "accuracy" describes the thickness error of any layer from its design specification, and "stability" describes the nature of error accumulation as deposition of multiple layers proceeds. Conventional methods of monitoring and controlling the deposition of thin films include use of a quartz crystal monitor or a single wavelength optical monitor. A quartz crystal monitor, which measures accumulated mass, has fair accuracy but poor stability. A single wavelength optical monitor has poor accuracy because of the difficulty in determining the precise reflection turning point that establishes a quarterwave thickness, but has good stability for quarterwave stacks and single cavity bandpass filters. Single wavelength optical monitors require frequent monitoring chip changes because of effects such as reflectance saturation and reflection changes when producing double cavity bandpass filters. When switching monitoring chips, the new chip may not be the same temperature and may have a different sticking coefficient, which can produce errors in the deposited layers.

A broadband spectral monitor has been used for the deposition of gradient index optical films, such as rugate filters, as described in U.S. Pat. No. 5,000,575 issued to Southwell et al., the teachings of which are incorporated herein by reference. Rugate filters comprise single layer thin films having small, continuous refractive index modulations around an average refractive index value. A broadband spectral monitor works well for such gradient refractive index films because it provides a measure of total optical thickness of the film.

Quarterwave stacks and gradient index optical films have limitations that make them unsuitable for certain applications. Non-quarterwave stacks, also known as enhanced thin films (ETFs), typically comprise many alternating layers of at least two different refractive index materials at various thicknesses ranging from a few to several thousand angstroms. Non-quarterwave ETFs provide higher performance in applications such as sharp edged band filters, broadband antireflection coatings, and tristimulus filters, :for example. Depositing non-quarterwave ETFs with a hundred layers, for example, requires individual layer thickness tolerances that are difficult to meet with conventional monitoring techniques. Therefore, a new method of monitoring and controlling the deposition of multiple layer thin films is needed to achieve greater deposition accuracy and stability resulting in improved thin film performance.

SUMMARY OF THE INVENTION

The present invention comprises a method of monitoring and controlling the deposition of multiple layer thin films, including quarterwave and non-quarterwave stacks, using a broadband spectral monitor and a generalized model of the multilayer film. As an example, a non-quarterwave stack (also known as an enhanced thin film or ETF) can be deposited on a substrate, such as glass, as alternate layers of at least two different refractive index materials of varying thicknesses.

A design specification, including the number of layers and the refractive index and thickness of each layer, is provided for the desired thin film. The desired optical thickness, which equals the physical thickness multiplied by the refractive index, is determined for each layer. A target optical thickness of the film is then computed by applying known correction factors to the desired (specified) optical thickness. For example, a target optical thickness may be computed for the deposition termination point of each layer using a generalized model, preferably a single layer model, of the multilayer thin film. A monitor chip, such as a silicon substrate, is used for monitoring the multiple layers of film deposition. During deposition of the film, a broadband spectral monitor (BBSM) comprising a source of broadband light (e.g., white light) is directed onto the monitoring chip. Light reflected by the monitoring chip is received by a photosensor that provides a broadband reflectance spectrum to a computer. The BBSM reflectance spectrum can be fit to the generalized model (the same model that was previously used to compute the target thickness values) to produce an output corresponding to the optical thickness of the deposited film. When the broadband spectral monitor optical thickness measurement equals the computed target thickness of the film, deposition of that layer is terminated and deposition of the next layer may commence. This process is repeated during the deposition of each successive layer until the entire multiple layer film is complete.

A principal object of the invention is the fabrication of high quality multiple layer thin films. A feature of the invention is a deposition process controlled using a broadband spectral monitor and a generalized model of the multilayer film. An advantage of the invention is improved control of the deposition process and improved performance of multiple layer thin films.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises a method of monitoring and controlling the deposition of a multiple layer thin film using a broadband spectral monitor (BBSM) and a generalized model of the multilayer film. A broadband spectral monitor has been used previously for monitoring and controlling the deposition of a single layer optical film having a continuous refractive index gradient (as in a rug ate filter). The broadband spectral monitor produces a reflectance spectrum that comprises interference fringes produced by reflections from the substrate-film interface and the film-atmosphere interface. Unlike single wavelength monitors used for producing quarterwave stacks, the broadband spectral monitor generally measures reflectance of an optical film at a wavelength (or wavelength band) that is away from (i.e., "off line") any stop band (i.e., a "line") or narrow pass band for which the film is designed.

Figure 1:
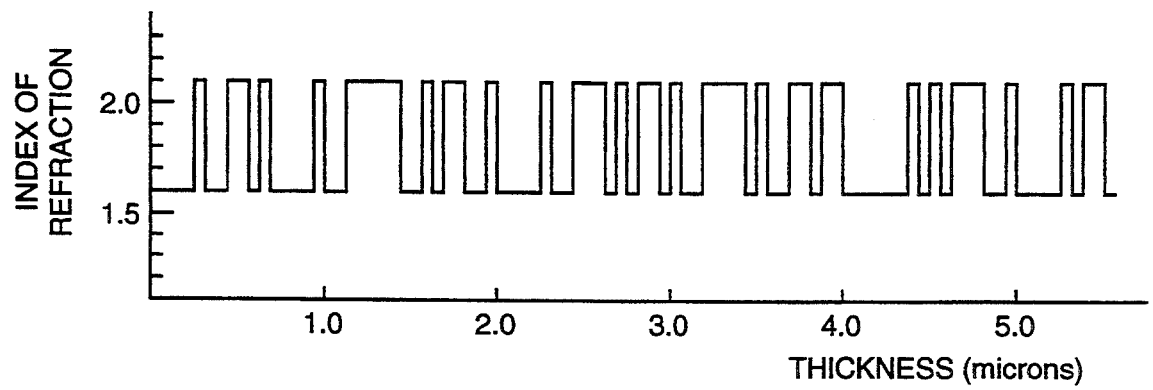
FIG. 1 is a plot of index of refraction versus thickness for an example of a multiple layer thin film forming a non-quarterwave stack.

In contrast to gradient index films, quarterwave stacks are thin films that comprise layers of at least two different refractive index materials, each layer having a thickness of λ/4. A non-quarterwave stack, also known as an enhanced thin film (ETF), is similar to a quarterwave stack except that the thicknesses of the individual layers can vary widely, as illustrated in FIG. 1, which plots index of refraction versus thickness for an example of a non-quarterwave ETF. An ETF may comprise a large number of alternating layers (up to hundreds, for example) with individual layer thicknesses ranging from a few to several thousand angstroms, for example. Non-quarterwave thin films offer maximum performance with the thinnest structure for many applications, such as sharp edge band filters, broadband antireflection coatings, and tristimulus filters, for example, when compared with rugate filters and quarterwave stacks. However, controlling the multilayer deposition process to the narrow tolerances required by non-quarterwave ETFs has been difficult using conventional means such as quartz crystal monitors and single wavelength optical monitors.

Prior to fabrication, a design specification, including the number of layers and the material, refractive index, and thickness of each layer, is provided for the desired thin film. The desired (specified) optical thickness, which equals the physical thickness multiplied by the refractive index, is determined for each layer. In depositing each layer of material to form the multilayer thin film, it is important to stop the deposition when each layer of material has reached the desired (specified design) thickness. Because the refractive index is constant for each layer, the parameter that must be controlled is the thickness of each individual layer in the multilayer film. Single wavelength optical monitors, as commonly used for deposition of quarterwave stacks, have poor accuracy (i.e., produce thickness errors) because of the difficulty in determining the precise reflection turning point that indicates a quarterwave thickness. A further drawback of single wavelength optical monitors is that the "on line" reflectance saturates, requiring a monitoring chip change. New monitoring chips may not be at the same temperature and may have different sticking coefficients that can introduce glitches into the deposited film.

As stated above, broadband spectral monitors have been used to control the refractive index of single layer gradient index thin films (such as rugate filters) during the deposition process. It has been discovered that use of a broadband spectral monitor can also overcome the limitations of quartz crystal monitors and single wavelength optical monitors in depositing quarterwave and non-quarterwave multiple layer films. A broadband monitor does not require a single wavelength turning point to determine optical thickness, and "off line" reflectance does not saturate so that monitoring chip changes are not needed for that reason.

Exact Reflectance Model

Attempts have been made to use a broadband spectral monitor to control the deposition of quarterwave and non-quarterwave multilayer films by using an exact model defined by the specified design (number of layers; thickness and refractive index of each layer) of the multilayer thin film. The exact reflectance model for fitting the measured broadband reflectance spectrum uses a characteristic matrix approach, which is known in the prior art and described, for example, by Macleod, supra. With this method, a two-by-two matrix is saved for each wavelength. Each matrix is updated by a single matrix multiplication at each measurement cycle. Thus, a matrix representing the current layer is multiplied by the base stack, i.e., the matrix representing all previously deposited layers. This process provides a "base stack update." The measured broadband reflectance spectrum is then fit (typically using least squares curve fitting techniques) to the reflectance calculated from the resulting matrix. The results of the fit are used to estimate the optical thickness of the current layer. This optical thickness estimate is then used to determine the deposition termination point for the current layer.

The exact reflectance model has been simulated and tested with disappointing results. Although it seems logical to control the multilayer film deposition using a exact model for the thickness of each layer, the actual deposition process introduces variations in refractive index of the materials and actual thicknesses of the deposited layers. Unfortunately, the base stack update (exact) method is not stable with respect to even small errors in the thickness measurements or uncertainties in the value of the refractive index of the materials being deposited. Because the base stack update method is an incremental approach that determines the optical thickness of only the layer currently being deposited, the small errors in each layer accumulate such that the reflectance/transmittance of the final film does not correspond to design specifications.

Generalized Model

In the present invention, a generalized model is used to characterize the total optical thickness the multilayer thin film. In the preferred embodiment, a single layer model is used. The single layer model for broadband reflectance of a thin film having a refractive index $n_a$ on a substrate having a refractive index $n_s$ is given by:

$$R = \frac{P_1 - \cos(4\pi V_1/\lambda)}{P_2 - \cos(4\pi V_1/\lambda)},$$

where $V_1$ is the optical thickness (OT), $\lambda$ is the wavelength, and $$P_1 = \frac{r_f^2 + r_b^2}{2 r_f r_b},$$

$$P_2 = \frac{1 + r_f^2 r_b^2}{2 r_f r_b}, \text{ and where}$$

$$r_f = \frac{1 - n_a}{1 + n_a}, \text{ and}$$

$$r_b = \frac{n_a - n_s}{n_a + n_s}.$$

The reflectance versus optical thickness for the single layer model (the first equation above) is predominately sinusoidal with a fixed average and amplitude. For the case of quarterwave stacks, the actual "off line" reflectance is predominately sinusoidal with approximately the same period as the first equation above, but with a variable average and amplitude. The single layer model can therefore be modified as $$R_{fit} = V_2 R + V_3,$$

where the reflectance R is expressed above. The fit parameters $V_2$ and $V_3$ are useful for obtaining stable estimates for the optical thickness $V_1$. Fitting these second and third parameters also compensates for drifts in the light source intensity and fogging of the chamber window. It is the periodicity of the sinusoidal reflectance variation, not the average or amplitude, that determines the optical thickness (OT) of the film.

When applying the single layer model to a multiple layer film, the mean refractive index of the multiple layer film is taken as the index $n_a$ in the equations above. Using a mean value for alternating high and low index layers in a model characterizing a single layer introduces an error into the calculated optical thickness of the film. However, using the mean refractive index of the film produces a well-characterized error that may be used to accurately terminate the deposition of a layer based on a broadband spectral monitor reading of the optical thickness. An important aspect of the present invention is the use of the known errors, which result from using a generalized model (such as the single layer model, for example), to compute a correction factor. The correction factor can then be applied to the desired (specified) optical thickness to compute a target optical thickness. The target optical thickness is a value used during actual thin film deposition to indicate the point at which deposition of a layer is terminated. In the method of the present invention, use of a generalized model maintains stability during the multilayer deposition process and application of a thickness correction factor provides high accuracy.

Determining the Spectral Window

Simulations and trials using the method of the present invention were conducted with an "off line" spectral window covering, for example, the wavelength band of 0.45 to 0.55 $\mu$m for a double cavity bandpass at 0.8 $\mu$m. In general, selection of the spectral window depends on the type of film being fabricated and its stop and pass band characteristics. When using the broadband spectral monitor, it is desirable to have a continuous progression of interference fringes to the right (i.e., toward longer wavelengths) as optical thickness of the film increases. Wavelength regions to avoid for the spectral window are those containing spikes or wash-out regions where the fringes all go flat. During simulations and trials, twenty wavelengths within the specified spectral window were typically used to fit the measurements from the broadband spectral monitor to the single layer model.

Monitoring and Controlling Deposition

In the general case of forming a multiple layer thin film, at least two materials having different indices of refraction are deposited in alternate layers on a substrate. The number of layers and the variation in their thickness are parameters (design specifications) that determine the optical performance characteristics of the completed film. As shown in FIG. 1, which illustrates an example of a multilayer film comprising alternating layers of two different refractive index materials, the deposition proceeds in discrete stages. The first optical material is deposited until a desired thickness is reached. At that point, deposition of the first material is stopped, and deposition of the second material is begun. This process is repeated until the entire multiple layer film has been completed.

Prior to fabrication of a thin film, the design specification is used to determine the optical thickness of the film at the end point (i.e., deposition termination point) of each layer of the film. A target optical thickness of the film is then computed for the end point of each layer using correction factors for the generalized model of the multilayer thin film described above. This is accomplished by using the design specification with the exact reflectance model (described above) to compute the anticipated reflectance spectrum expected for the film. The anticipated reflectance spectrum is then fit (typically using least squares curve fitting techniques) to the reflectance spectrum produced by the generalized model (e.g., the single layer model). The best fit optical thicknesses of the film corresponding to the termination points of the layers become the target optical thicknesses for those layers. In the preferred embodiment of the invention, the multilayer film is characterized using a single layer model as explained above. However, the target optical thickness values differ (by the correction factor) from the actual film thickness values at the layer end points because the generalized model (e.g., the single layer model) is used instead of the exact (i.e., actual multilayer) model to compute the values.

Figure 2:
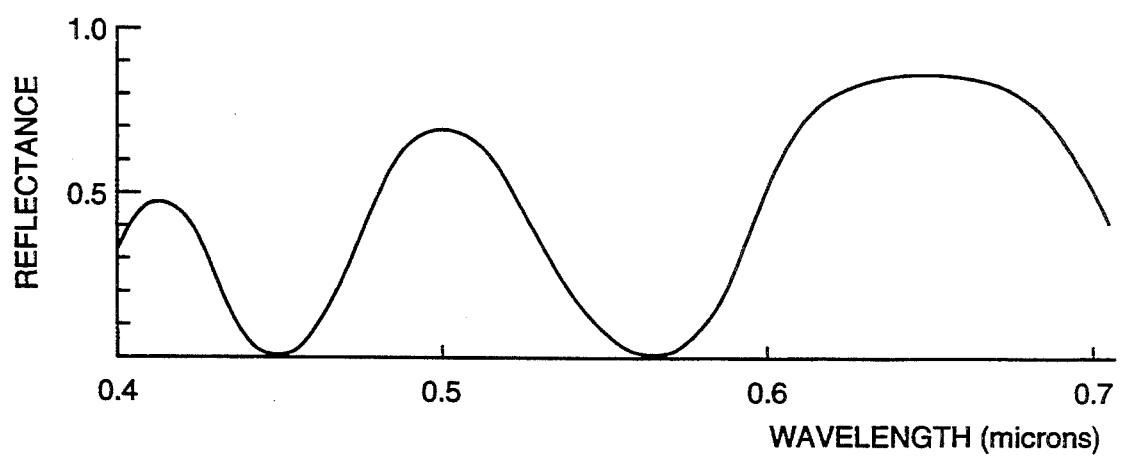
FIG. 2 is an example of a plot of reflectance versus wavelength (i.e., a reflectance spectrum) produced by several layers of a thin film when illuminated by a broadband spectral monitor.

During deposition of a layer of material, the broadband spectral monitor is used to illuminate the monitoring chip substrate and deposited material, including any previously deposited base layers on the monitoring chip. A reflectance spectrum, comprising interference fringes providing a measure of reflectance versus wavelength, as illustrated by the example in FIG. 2, is received by a broadband photosensor that inputs the data to a computer processor. Selected points of the measured broadband reflectance spectrum in the designated spectral window are fit to the generalized model (typically using least squares curve fitting techniques). The computer calculates the measured optical thickness of the film on the monitoring chip based on the best fit with the generalized model.

Figure 3:
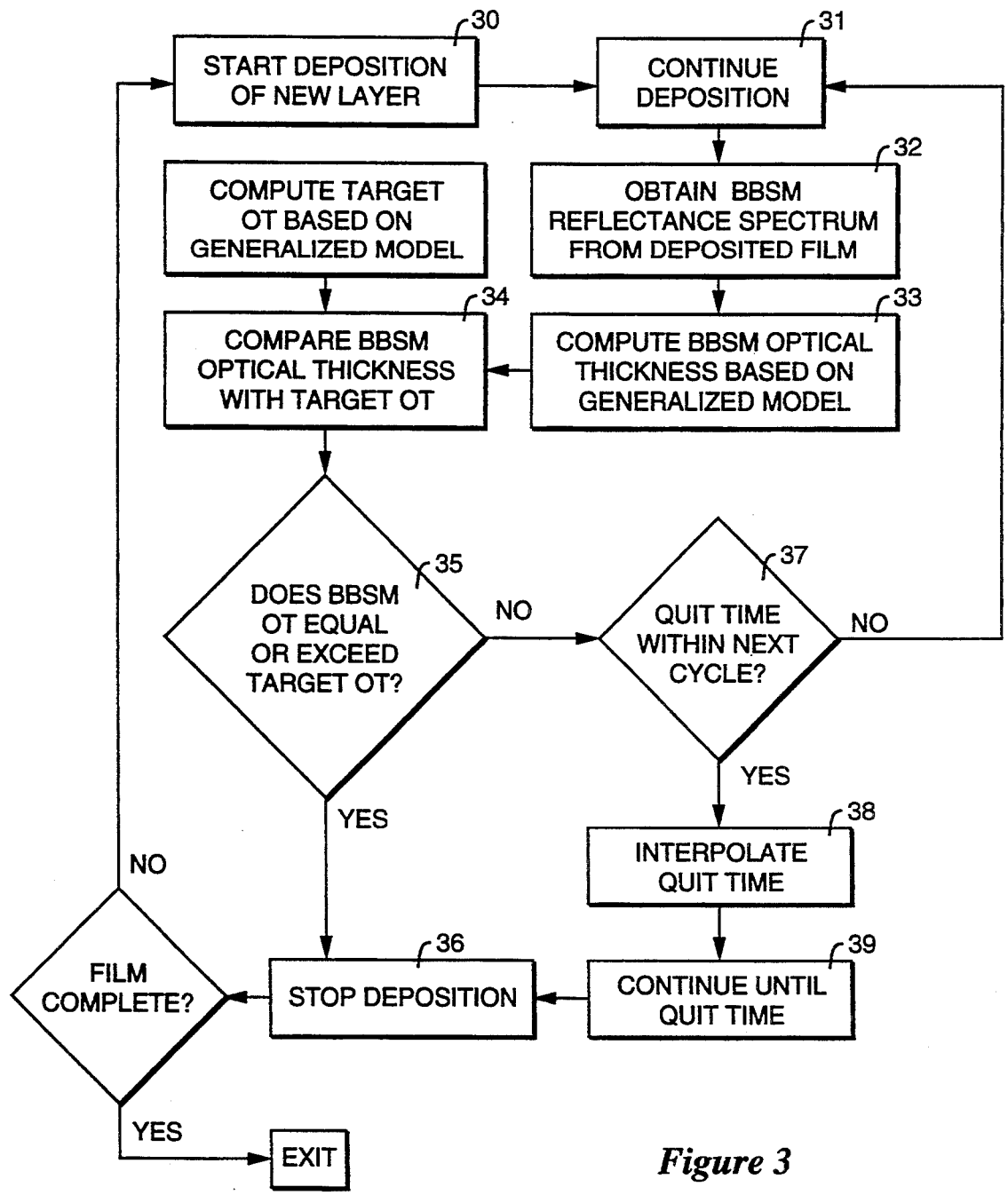
FIG. 3 is a logic flow diagram for a basic method of the present invention.

The basic process of the present invention is illustrated in the flow diagram of FIG. 3. Each stage of fabricating a multiple layer thin film begins with the deposition 30 of a new layer of material. This new deposition may be the first layer deposited on the substrate or any subsequent layer deposited on a previously deposited base stack of layers. As the deposition continues 31, a broadband spectral monitor (BBSM) is used to obtain a reflectance spectrum 32 from the film (including the layer currently being deposited and any base layers) deposited on the monitoring chip (each layer of the film is simultaneously deposited on the specified substrate as well as the monitoring chip). The reflectance data from the BBSM is provided to the computer for calculating the optical thickness (OT) 33 of the deposited film based on the generalized model (which is a single layer model in the preferred embodiment). As explained above, this OT measurement 33 is in error with respect to the specified optical thickness of the multilayer film because it is calculated using the generalized model rather than an exact model. However, the target optical thickness (as described above) has been computed from the design specifications using the same generalized model that is used to determine the BBSM measured optical thickness. At step 34, the computer compares the BBSM measured optical thickness with the target optical thickness. The BBSM measured optical thickness 33 can be compared directly with the target optical thickness at step 34 because both relate to the total thickness of the deposited film and both are computed using the same generalized model.

The process described above works only as long as the optical thickness computed from the BBSM reflectance spectrum at 33 is monotonically increasing with the true (actual) thickness of the film. At some point after the deposition of several layers, roughly in the range of 8 to 50 layers depending on the "spectral window" of the monitor and how far that window is from the spectral structure (i.e., from stop bands or narrow pass bands) of the film, the monotonically increasing property may fail. The monitoring chip should be changed between layers before this occurs.

Returning to the process of FIG. 3, the computed BBSM OT is compared at step 35 to the target OT. If the BBSM OT has increased to equal (or exceed) the target thickness, deposition of the layer is terminated at step 36. If the BBSM OT does not equal the design thickness, a determination must be made at step 37 as to whether the "QuitTime" will be within the next BBSM measurement cycle. If the "QuitTime" will not occur within the next cycle, deposition continues at step 31. If it is determined that the "QuitTime" will occur before the next measurement cycle, an interpolation, as described below, can be made at step 38 to compute the required "QuitTime." Deposition then continues at step 39 until the "QuitTime" is reached, as at which point deposition is stopped at step 36. If the multilayer film is not complete when deposition stops at step 36, deposition of a new layer having a different refractive index material commences at step 30. If the entire film has been completed when deposition stops at step 36, all deposition is terminated and the process is exited.

In the special case of fabricating a quarterwave stack, the target optical thicknesses can be computed using the specified cumulative optical thickness values at the layer end points. This method introduces an error into the actual deposited layer thicknesses because the measured optical thickness from the broadband spectral monitor, which is computed using the generalized model, is compared to the specified cumulative optical thickness values that have not been adjusted by the generalized model (i.e., no correction factor applied). During tests of this variation of the method in fabricating a quarterwave stack, it was determined that the layers of high index material were almost uniformly thick and the layers of low index material were almost uniformly thin. Because half-wave periodicity is a predominant factor in optical performance of quarterwave stacks, however, the errors in the individual layers tend to offset each other when paired, resulting in excellent performance of the stack. This variation of the present invention, for the specialized case of quarterwave stacks, thus produces an automatic redesign "on-the-fly" that measures total optical thickness and determines the end point for each layer in a manner that compensates for whatever material has already been deposited. Although the self-compensating feature of this variation of the present invention produces excellent quarterwave stacks, the more accurate method described above (using correction factors) is generally needed for producing films such as non-quarterwave ETFs.

Interpolation of "QuitTime"

Using a generalized model to compute a target optical thickness produces a known error compared with the exact reflectance model (base stack update) as described above. However, knowing the optical thickness error at the end of the current layer is not always sufficient for determining the correct deposition termination point. For positive errors, one cannot wait until the layer is complete according to the BBSM measurements because the layer is already too thick and deposited material cannot be removed. Therefore, one must be able to determine the optical thickness error in the region of the layer termination point.

One method for determining the error ER at an optical thickness OT is to evaluate $ER_1$ at $OT_1$, which is one delta optical thickness ($\Delta OT$) from the exact end of the layer, and $ER_2$ at $OT_2$, which is the total optical thickness at the exact end of the layer. $\Delta OT$ is the optical thickness that is deposited by the current material at the established rate for that material for a period of time equal to the time between measurements by the broadband spectral monitor (such as 5 seconds, for example). To interpolate the error at any arbitrary total optical thickness in the region near the end of the layer, coefficients of a linear fit between $ER_1$ and $ER_2$ may be calculated as follows:

$$ER = a + b\, OT, \text{ where}$$

$$b = \frac{ER_2 - ER_1}{OT_2 - OT_1}, \text{ and}$$

-continued $$a = ER_2 - b\,OT_2.$$

This calculation is generally performed as a computer subroutine. A vector of the coefficients a and b can be saved and applied for each layer. These calculations are used to determine when to terminate deposition of the layer currently being deposited. After each optical thickness measurement is made by the broadband spectral monitor, a calculation is made to determine if the actual (design) end of the layer will occur before the next measurement. This may be determined by ascertaining whether $$OT - ER + \Delta OT \geq OT_{end},$$

where $OT_{end}$ is the true total thickness at the end of the current layer, ER is calculated as shown above, and OT is the latest optical thickness measurement from the broadband spectral monitor. If this condition is satisfied, then "QuitTime" (i.e., the time left before closing the shutter on the current layer deposition) is calculated by:

$$\text{QuitTime} = \frac{OT_{end} - OT - ER}{\Delta OT} \times \text{CycleTime},$$

where "CycleTime" is the time between measurements of the broadband spectral monitor.

Monitoring Layer Thickness

Figure 4:
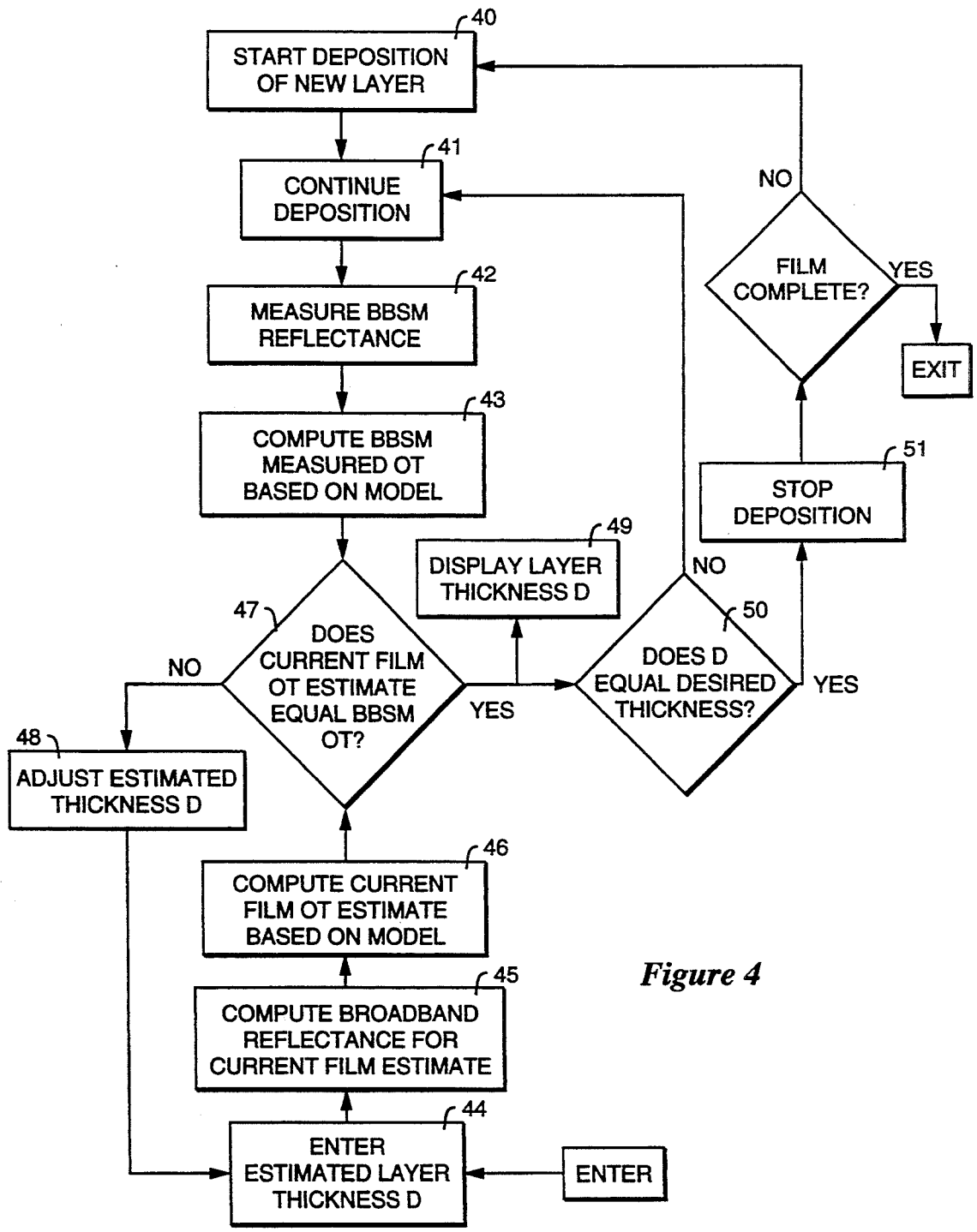
FIG. 4 is a logic flow diagram for an alternate method of the present invention.

A variation of the basic process of the present invention is illustrated in the flow diagram of FIG. 4. In this process, the deposition 40 of each new layer of a thin film is monitored with a BBSM to measure reflectance 42 and compute a least squares BBSM OT 43 based on the preferred single layer model as described above. While deposition is being monitored, an estimated layer thickness D, which initially may be zero or (typically) an anticipated small thickness value for the new layer being deposited at step 40, is entered into the computer at step 44. The computer combines the estimated layer thickness D with the base stack of previously deposited layers (if any) of known thickness and refractive index for the film to that point. At step 45 the broadband reflectance is computed for the current base stack (including the current layer of estimated thickness D) using exact characteristic matrix theory as explained above. At step 46 a least squares optical thickness estimate is computed for the current film by fitting the the computed reflectance 45 to the single layer model. At step 47 the optical thickness estimate 46 for the current film is compared with the BBSM measured OT 43. If these values are not equal, an adjustment 48 is made to the estimated layer thickness D, which is reentered into the computer at step 44. The iterative computation of layer thickness D proceeds at a faster rate than measurement and computation of BBSM OT 43 so that the computer rapidly determines the actual layer thickness D for which the current total film optical thickness matches the measured BBSM OT at step 47. When these OT values are equal, the computer compares the layer thickness D with the specified (desired) thickness for the layer being deposited. At this point in the process, the computer can provide an output or display 49 of the current thickness D (or optical thickness computed using the known refractive index of the material) of the layer being deposited, as well as a computation of the remaining deposition necessary to reach the specified thickness for that layer. If the layer thickness D does not equal the desired layer thickness at step 50, deposition is continued at step 41 and the previous steps in the process are repeated. When the layer thickness D equals the desired layer thickness at step 50, deposition of that layer of material is terminated at step 51. If the multilayer film is not complete at step 51, deposition of a new layer of material with a different refractive index may be started at step 40. When all layers of the multilayer film have been deposited at step 51, deposition is terminated and the process is exited.

In the process illustrated in FIG. 4, a step for interpolation of "QuitTime," as described above and applied in the basic process of FIG. 3, may be included in the method. However, since the process of FIG. 4 continuously computes and outputs the layer thickness D, which is a "real time" estimate of the thickness of the layer currently being deposited, interpolation of the "QuitTime" (to terminate deposition between measurement cycles) may not be necessary if the BBSM measurement cycle time is sufficiently short.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A method of forming a multiple layer thin film, comprising the steps of:
   providing a design specification for the film including the number of layers and the material, refractive index, and thickness of each of said layers;
   providing a generalized model for characterizing the multiple layer film;
   computing target optical thicknesses of the film corresponding to the termination of each of said layers;
   depositing said layers of material on a substrate;
   directing a broadband source of light onto said layers deposited on said substrate;
   measuring a broadband reflectance spectrum from said layers deposited on said substrate;
   computing a measured optical thickness of the film from said broadband reflectance spectrum using said generalized model of the film; and
   terminating deposition of each of said layers when said measured optical thickness equals said corresponding target optical thickness.

2. The method of claim 1, wherein said step of providing a generalized model comprises providing a single layer model for characterizing the multiple layer film.

3. The method of claim 2, wherein said step of computing said target optical thicknesses comprises applying a correction factor to said specified thicknesses of said layers.

4. The method of claim 2, wherein said step of computing said target optical thicknesses comprises computing said target optical thicknesses using said single layer model.

5. The method of claim 1, wherein the multilayer film comprises a quarterwave stack and said step of computing said target optical thicknesses comprises computing cumulative optical thicknesses of the film corresponding to said specified thicknesses of said layers.

6. The method of claim 1, wherein the step of computing said measured optical thickness includes the steps of:
   selecting a spectral window from said broadband reflectance spectrum;
   selecting points from said broadband reflectance spectrum within said spectral window;
   fitting a curve through said selected points based on said generalized model; and
   determining said measured optical thickness from said curve.

7. The method of claim 6, wherein the step of selecting said spectral window comprises selecting said spectral window from a region of said broadband reflectance spectrum that is removed from stop bands and narrow pass bands of the multiple layer film.

8. A method of depositing layers of material to form a multiple layer thin film, comprising the steps of:
   providing a design specification for the film including the number of layers and the material, refractive index, and thickness of each of said layers;
   characterizing the multiple layer film using a single layer model;
   computing target optical thicknesses of the film corresponding to the termination of each of said layers using said single layer model of the film;
   depositing said layers of material on a substrate;
   directing a broadband source of light onto said layers deposited on said substrate;
   measuring a broadband reflectance spectrum from said layers deposited on said substrate;
   computing a measured optical thickness of the film from said broadband reflectance spectrum using said single layer model of the film; and
   terminating deposition of each of said layers when said measured optical thickness equals said corresponding target optical thickness.

9. The method of claim 8, wherein the step of computing said measured optical thickness includes the steps of:
   selecting a spectral window from said broadband reflectance spectrum;
   selecting points from said broadband reflectance spectrum within said spectral window;
   fitting a curve through said selected points based on said single layer model; and
   determining said measured optical thickness from said curve.

10. The method of claim 9, wherein said curve fitting step comprises fitting said curve using least squares curve fitting techniques.

11. The method of claim 9, wherein the step of selecting said spectral window comprises selecting said spectral window from a region of said broadband reflectance spectrum that is removed from stop bands and narrow pass bands of the multiple layer film.

12. The method of claim 8, wherein said depositing step comprises depositing said layers at known rates of deposition, the method further comprising the step of interpolating times for terminating deposition of each of said layers based on said measured optical thicknesses and said known rates of deposition.

13. A method of controlling deposition of material forming a layer of a multiple layer thin film, comprising the steps of:
   depositing a layer of material on top of at least one previously deposited layer of the film on a substrate;
   directing a broadband source of light onto the film on said substrate during deposition of said layer of material;
   measuring a broadband reflectance spectrum from the film deposited on said substrate;
   computing a measured optical thickness of the film from said broadband reflectance spectrum using a single layer model of the multiple layer film;
   computing optical thickness of said layer of material being deposited based on said measured optical thickness of the film; and
   terminating deposition of said layer of material when said computed optical thickness of said layer of material equals a specified optical thickness for said layer.

14. The method of claim 13, wherein the step of computing said layer optical thickness further comprises the steps of:
   providing an estimated thickness of said layer of material being deposited;
   computing a broadband reflectance for the film including said estimated layer thickness;
   computing an estimated film optical thickness from said computed broadband reflectance using said single layer model;
   comparing said estimated film optical thickness with said measured film optical thickness; and
   computing said layer optical thickness when said estimated film optical thickness equals said measured film optical thickness.

15. The method of claim 13, wherein the step of computing said measured film optical thickness includes the steps of:
   selecting a spectral window from said broadband reflectance spectrum;
   selecting points from said broadband reflectance spectrum within said spectral window;
   fitting a curve through said selected points based on said single layer model; and
   determining said measured film optical thickness front said curve.

16. The method of claim 15, wherein said curve fitting step comprises fitting said curve using least squares curve fitting techniques.

17. The method of claim 15, wherein the step of selecting said spectral window comprises selecting said spectral window from a region of said broadband reflectance spectrum that is removed from stop bands and narrow pass bands of the multiple layer film.

18. The method of claim 13, wherein said depositing step comprises depositing said layer at a known rate of deposition, the method further comprising the step of interpolating time for terminating deposition of said layer of material based on said computed optical thickness of said layer of material and said known rate of deposition.

* * * * *